(12) United States Patent
Vayssiere et al.

(10) Patent No.: US 11,603,180 B2
(45) Date of Patent: Mar. 14, 2023

(54) VEHICLE WITH AT LEAST ONE EMERGENCY EXIT SYSTEM

(71) Applicants: AIRBUS HELICOPTERS DEUTSCHLAND GMBH, Donauworth (DE); AIRBUS HELICOPTERS, Marignane (FR)

(72) Inventors: Aurelien Vayssiere, Niederschoenenfeld (DE); Bernhard Rein, Rain (DE); Sven Laessig, Rain (DE); Hubert Neukirch, Dillingen (DE); Pierre Fruitet, Pompignan (FR)

(73) Assignees: AIRBUS HELICOPTERS DEUTSCHLAND GMBH, Donauworth (DE); AIRBUS HELICOPTERS, Marignane (FR)

( * ) Notice: Subject to any disclaimer, the term of this patent is extended or adjusted under 35 U.S.C. 154(b) by 97 days.

(21) Appl. No.: 17/109,355

(22) Filed: Dec. 2, 2020

(65) Prior Publication Data
US 2021/0229794 A1 Jul. 29, 2021

(30) Foreign Application Priority Data

Jan. 24, 2020 (EP) ..................................... 20315009

(51) Int. Cl.
*B64C 1/32* (2006.01)
*B64D 25/08* (2006.01)
(Continued)

(52) U.S. Cl.
CPC ............... *B64C 1/32* (2013.01); *B64C 1/1492* (2013.01); *B64C 27/04* (2013.01); *B64D 25/08* (2013.01)

(58) Field of Classification Search
CPC ....... B64C 1/32; B64C 1/1484; B64C 1/1492; B64C 1/1438; B64C 1/1461; B64D 25/08
See application file for complete search history.

(56) References Cited

U.S. PATENT DOCUMENTS

| | | | |
|---|---|---|---|
| 1,874,392 A * | 8/1932 | Meter, Jr. ............... | B64D 25/12 244/138 R |
| 2,196,546 A | 4/1940 | Bowers | |

(Continued)

FOREIGN PATENT DOCUMENTS

| CN | 106740637 A | 5/2017 |
|---|---|---|
| CN | 206678938 U | 11/2017 |

(Continued)

OTHER PUBLICATIONS

European Search Report for European Application No. EP 20315009.9, Completed by the European Patent Office, dated Aug. 13, 2020, 7 pages.

*Primary Examiner* — Joshua J Michener
*Assistant Examiner* — Ka Chun Leung
(74) *Attorney, Agent, or Firm* — Brooks Kushman P.C.

(57) ABSTRACT

An aircraft with a fuselage and at least one emergency exit system, the at least one emergency exit system including a jettisonable component that is accommodated and locked in an associated frame structure of the aircraft in normal operation mode to form a portion of the fuselage and that is releasable from the associated frame structure for being jettisoned from the aircraft in an emergency mode; and further including an emergency evacuation assistance device that is adapted to assist in an emergency evacuation of the aircraft via the associated frame structure in the emergency mode; wherein the emergency evacuation assistance device is attached to the jettisonable component such that the emergency evacuation assistance device is deployed by means of the jettisonable component when the jettisonable component is jettisoned from the aircraft in the emergency mode.

20 Claims, 8 Drawing Sheets

(51) Int. Cl.
    *B64C 27/04*     (2006.01)
    *B64C 1/14*     (2006.01)

(56) References Cited

U.S. PATENT DOCUMENTS

| | | | |
|---|---|---|---|
| 3,547,382 A * | 12/1970 | Stanley | B64D 25/08 |
| | | | 244/121 |
| 3,851,845 A | 12/1974 | Edwards | |
| 4,102,011 A | 7/1978 | Clack | |
| 4,557,442 A * | 12/1985 | Krezak | A62B 1/20 |
| | | | 182/100 |
| 4,776,532 A | 10/1988 | Haltbrekken | |
| 4,978,089 A | 12/1990 | Alquier et al. | |
| 5,826,824 A | 10/1998 | Martin et al. | |
| 6,027,073 A | 2/2000 | Gratien Ferrier | |
| 6,189,833 B1 | 2/2001 | Ambrose et al. | |
| 8,826,597 B2 | 9/2014 | Raspic | |
| 9,745,044 B2 | 8/2017 | Salgues et al. | |
| 2012/0085033 A1 | 4/2012 | Krahl | |
| 2014/0175220 A1 | 6/2014 | Durand et al. | |
| 2016/0130007 A1 * | 5/2016 | Lafon | B63C 9/04 |
| | | | 244/129.4 |
| 2016/0355249 A1 * | 12/2016 | Joussellin | B64C 1/1492 |
| 2017/0320583 A1 * | 11/2017 | Schmidt | B64D 25/14 |
| 2018/0057178 A1 | 3/2018 | Devitt et al. | |
| 2019/0118006 A1 * | 4/2019 | Leachman | B64D 11/0633 |

FOREIGN PATENT DOCUMENTS

| | | |
|---|---|---|
| DE | 20217925 U1 | 3/2003 |
| DE | 102009060606 A1 | 6/2011 |
| EP | 0206478 A2 | 12/1986 |
| EP | 2626294 A2 | 8/2013 |
| EP | 2749492 A1 | 7/2014 |
| EP | 3100947 A1 | 12/2016 |
| EP | 3473546 A1 | 4/2019 |
| FR | 2979898 A1 | 3/2013 |

* cited by examiner

VEHICLE WITH AT LEAST ONE EMERGENCY EXIT SYSTEM

CROSS-REFERENCE TO RELATED APPLICATIONS

This application claims priority to European patent application No. EP 20315009.9 filed on Jan. 24, 2020, the disclosure of which is incorporated in its entirety by reference herein.

BACKGROUND OF THE INVENTION

(1) Field of the Invention

The present embodiments are related to a vehicle with at least one emergency exit system.

(2) Description of Related Art

Various vehicles are provided with emergency exit systems. For instance, aircrafts and, by way of example rotorcrafts, are provided with emergency exit systems that are required in order to allow passengers and crew members to exit the rotorcrafts rapidly and securely in case of an emergency. Therefore, the emergency exit systems must be provided in the rotorcrafts such that they allow a quick and easy opening and/or removal of associated emergency exits in order to enable a fast and reliable evacuation of the rotorcrafts in case of an emergency. This may e.g. be achieved by implementing at least part of the emergency exits in rotorcrafts by means of jettisonable emergency windows that are assembled separately on a given rotorcraft structure.

More particularly, in a rotorcraft and, more specifically in a helicopter, all windows can be implemented as jettisonable emergency windows. If the helicopter comprises e.g. one pilot door window, one co-pilot door window, two sliding door windows, and two intermediate windows arranged in-between the sliding door windows and the pilot and co-pilot windows, the helicopter can be provided with six emergency exits in the form of jettisonable emergency windows.

When using such jettisonable emergency windows as emergency exits in rotorcrafts, usually each such jettisonable emergency window is bonded on a separate window frame. This window frame is then assembled and retained on an associated frame structure provided on an underlying rotorcraft fuselage, i.e. on a given airframe structure, only by means of corresponding retaining and locking mechanisms. These retaining and locking mechanisms are designed to be activatable in case of an emergency such that a respective jettisonable emergency window can be jettisoned entirely (i.e., removed and thrown away) easily and quickly from the given airframe structure in an outward direction, seen from an interior of a respective rotorcraft.

However, activation of the retaining and locking mechanisms must be secured in order to avoid an unintentional and erroneous activation thereof, in particular from crew members and/or passengers of the rotorcraft during flight or on ground. Therefore, each possible misunderstanding with respect to the retaining and locking mechanisms has to be taken into account for safety reasons. For instance, it must imperatively be avoided that a crew member and/or passenger may pull up an emergency handle of the retaining and locking mechanisms on ground instead of the handle of an aircraft door, as this will unnecessarily activate the retaining and locking mechanisms and lead to jettisoning of a jettisonable emergency window, which must subsequently be replaced.

Moreover, the applicable safety regulations of the European Aviation Safety Agency (EASA) require a predetermined utilization and accessing facility and a specific environment for such an emergency handle of a jettisonable emergency window. As an example, the emergency handle must be clearly visible, near to adjacent seats and operable with a maximum force of 200 N to jettison and to push out the jettisonable emergency window.

Currently, jettisonable emergency windows are implemented in various different ways. For instance, a jettisonable emergency window with a conventional rotatable or translationally movable handle is described in document EP 2 626 294 A2.

Alternatively, removal of a part of the jettisonable emergency window as such can be required for jettisoning the latter in case of an emergency. For instance, a predetermined axle of the jettisonable emergency window can be removable or any other part of the latter. However, such a solution is not compliant to ergonomics and safety rules, in particular the EASA safety regulations, as such a system would generally not be simple and easy to operate, particularly in critical situations such as a rotorcraft crash and/or ditching. This likewise applies if a given emergency handle is covered by a cover plastic/box, which could potentially further lead to provision of sharp and, thus, potentially dangerous edges.

Still alternatively, a safety wire can be provided for jettisoning the jettisonable emergency window in case of an emergency, as e.g. described in the document DE 202 17 925 U1.

Other jettisonable emergency windows are likewise known. By way of example, the document US 2012/0085033 A1 describes a jettisonable emergency window that can be jettisoned in case of an emergency by means of a pressure source acting on an inflatable seal.

U.S. Pat. No. 4,102,011 describes an aircraft door that is adapted to pivot about a pair of vertical hinges, which are detachably fixed to an associated door frame by a secondary joint provided at each hinge, wherein retraction of a short horizontal pin provided at each secondary joint releases the door for jettisoning.

U.S. Pat. No. 8,826,597 describes a sealed framework for secured jettisoning of a detachable panel.

U.S. Pat. No. 6,027,073 describes a window frame for a helicopter that is intended to fix an emergency window onto a support wherein the window frame includes cutting out means that are driven by pulling on at least a part of the window perimeter in order to divide a section of the frame at least into two parts and, thus, to detach the window frame from the support.

U.S. Pat. No. 3,851,845 describes an aperture closure device incorporating a quick release mechanism to effect jettisoning of an aircraft door that is provided with the device in case of an emergency, wherein the device includes a plurality of separable hinges operated by means of a single lever from within the aircraft, which can further incorporate means for simultaneously releasing a provided normal door closing mechanism, so that effecting complete release of the aperture closure device by operation of the single lever can be achieved.

The document U.S. Pat. No. 5,826,824 in turn describes an emergency egress system that is designed for facilitating emergency egress of passengers and/or crew members from a helicopter. This egress system includes an egress panel that is implemented by a cockpit window as a jettisonable emergency window and that is accommodated in an associated panel frame, which is implemented by a fuselage of the helicopter and, thus, represents a fuselage frame. Furthermore, a weather strip defines back-to-back channels for accepting the peripheral edges of the jettisonable emergency window and the fuselage frame. Moreover, the emergency egress system includes a plurality of retention devices disposed about the periphery of the jettisonable emergency window for laterally retaining the latter with respect to the fuselage frame in a normal operating mode, a cam operative to forcibly urge a portion of the weather strip out of engagement with one of the peripheral edges and an actuating device operative to sequentially disengage at least one of the retention devices and actuate the cam case of an emergency in a corresponding emergency operating mode. Following actuation, a passenger and/or crew member may detach the jettisonable emergency window from the fuselage frame.

The document EP 3 100 947 A1 describes a jettisonable emergency exit for a vehicle, comprising an outer peripheral edge that is adapted to be accommodated in an associated frame provided in a vehicle, wherein at least one emergency exit retention means and at least one emergency exit locking device are integrated into said outer peripheral edge, said at least one emergency exit retention means comprising at least one non-retractable pivot finger around which said jettisonable emergency exit is rotatable in an emergency mode, and said at least one emergency exit locking device comprising at least one locking hook that is adapted for locking said jettisonable emergency exit in an associated locking position in normal operation mode and for releasing said jettisonable emergency exit in an associated retracted position in said emergency mode.

However, the mere provision of such a jettisonable emergency exit is not always sufficient to comply with all safety regulations of the EASA. More specifically, safety regulations for large rotorcraft, such as the Certification Specifications for Large Rotorcraft CS-29 of the EASA, require according to Amendment 3 that was published in December 2012 means for assisting the crew and passengers of an aircraft in evacuating the aircraft. More specifically, CS 29.809(f) requires that "each land-based rotorcraft emergency exit must have an approved slide [ . . . ], or its equivalent, to assist occupants in descending to the ground from each floor level exit and an approved rope, or its equivalent, for all other exits, if the exit threshold is more than 1.8 m (6 ft) above the ground". Thus, when using the above described jettisonable emergency exits, provision of respective slides or ropes may still be required.

Accordingly, some aircrafts may have ropes for assisting in an emergency egress. By way of example, the documents EP 3 473 546 A1, EP 206 478 A1, and U.S. Pat. No. 4,776,532 describe aircrafts that are provided with emergency exit systems that use ropes. Alternatively, the document FR 2 979 898 A1 describes an aircraft that is provided with an emergency exit system that uses a ladder. Still other emergency exit systems are described in the documents U.S. Pat. No. 4,978,089, EP 2,749,492, and U.S. Pat. No. 9,745,044.

However, in all emergency exit systems in rotorcrafts and, more generally, in aircrafts which use ropes, respective rope stowage's are usually installed on the cabin floor next to associated seats. Thus, they are installed inside the aircrafts and not accessible from outside the aircrafts.

Furthermore, crew members and/or passengers of a given aircraft usually have to perform several actions with conventional emergency exit systems when egressing the given aircraft, including activating and jettisoning of the emergency exit and, subsequently, moving of the rope from its storage position outside of the emergency exit. Only then can the crew members and/or passengers begin evacuating the aircraft.

BRIEF SUMMARY OF THE INVENTION

It is, therefore, an object to provide a new vehicle with an emergency exit system, in particular an aircraft and, more particularly, a rotorcraft such as a helicopter, wherein the emergency exit system is failsafe and easy and safe to operate. This object is solved by a vehicle having the features of claim 1.

More specifically, according to one aspect a vehicle with at least one emergency exit system comprises a jettisonable component that is accommodated and locked in an associated frame structure of the vehicle in normal operation mode, and releasable from the associated frame structure for being jettisoned from the vehicle in an emergency mode; and an emergency evacuation assistance device that is adapted to assist in an emergency evacuation of the vehicle via the associated frame structure in the emergency mode. The jettisonable component is operable from inside and/or outside of the vehicle for being released from the associated frame structure. The emergency evacuation assistance device is attached to the jettisonable component such that the emergency evacuation assistance device is deployed by means of the jettisonable component when the jettisonable component is jettisoned from the vehicle in the emergency mode.

The emergency exit system may be an integrated component, wherein all parts are at least essentially implemented and integrated into the emergency exit system itself. In other words, all emergency exit retention means, emergency exit locking devices, emergency exit activation straps, associated activation handles, the jettisonable component, and the emergency evacuation assistance device are at least essentially provided within the emergency exit system as such.

The emergency evacuation assistance device is preferably part of a rope system that is merged inside the emergency exit system. Merging the rope system inside the emergency exit system may ensure that a respective rope is immediately deployed when the jettisonable component is jettisoned.

Furthermore, implementing the emergency evacuation assistance device as part of a rope system enables provision of a reliable, secure and inexpensive emergency evacuation assistance device in the form of a rope or a rope ladder. Advantageously, such a rope or rope ladder can be arranged at a location in which it is accessible from the inside and from the outside of the vehicle.

According to one aspect, the emergency evacuation assistance device is a rope, in particular a textile rope.

According to one aspect, the emergency evacuation assistance device is a rope ladder.

According to one aspect, the emergency evacuation assistance device withstands at least a 182 kg static load.

According to one aspect, the emergency evacuation assistance device is stored in the associated frame structure of the vehicle in the normal operation mode, and deployed from the associated frame structure by means of the jettisonable component when the jettisonable component is jettisoned from the vehicle in the emergency mode.

According to one aspect, the associated frame structure comprises a hollow profile, and the emergency evacuation assistance device is stored in the hollow profile in the normal operation mode.

According to one aspect, the emergency evacuation assistance device is rigidly attached to the associated frame structure.

According to one aspect, the jettisonable component is a vehicle window with a window frame that is accommodated and locked in the associated frame structure of the vehicle in the normal operation mode, wherein the emergency evacuation assistance device is rigidly attached to the window frame.

According to one aspect, the associated frame structure is provided in a vehicle door of the vehicle.

According to one aspect, the vehicle door of the vehicle is a sliding door.

According to one aspect, the jettisonable component is at least provided with a first operating device that forms an inner operating handle, and a second operating device that forms an outer operating handle, the inner and outer operating handles being arranged on opposed sides of the jettisonable component and being activatable for releasing the jettisonable component from the associated frame structure in the emergency mode.

According to one aspect, the vehicle comprises a plurality of emergency exit systems, wherein each one of the plurality of emergency exit systems comprises an associated jettisonable component and an emergency evacuation assistance device that is attached to the associated jettisonable component such that the emergency evacuation assistance device is deployed by means of the associated jettisonable component when the associated jettisonable component is jettisoned from the vehicle in the emergency mode.

According to one aspect, the vehicle is embodied as a rotorcraft, in particular a large rotorcraft.

According to one aspect, the associated frame structure is provided in a fuselage, a pivotable door, or a sliding door of the vehicle.

According to one aspect, the associated frame structure forms an inner opening having a width of at least 0.48 m and a height of at least 0.66 m.

BRIEF DESCRIPTION OF THE DRAWINGS

Preferred embodiments are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
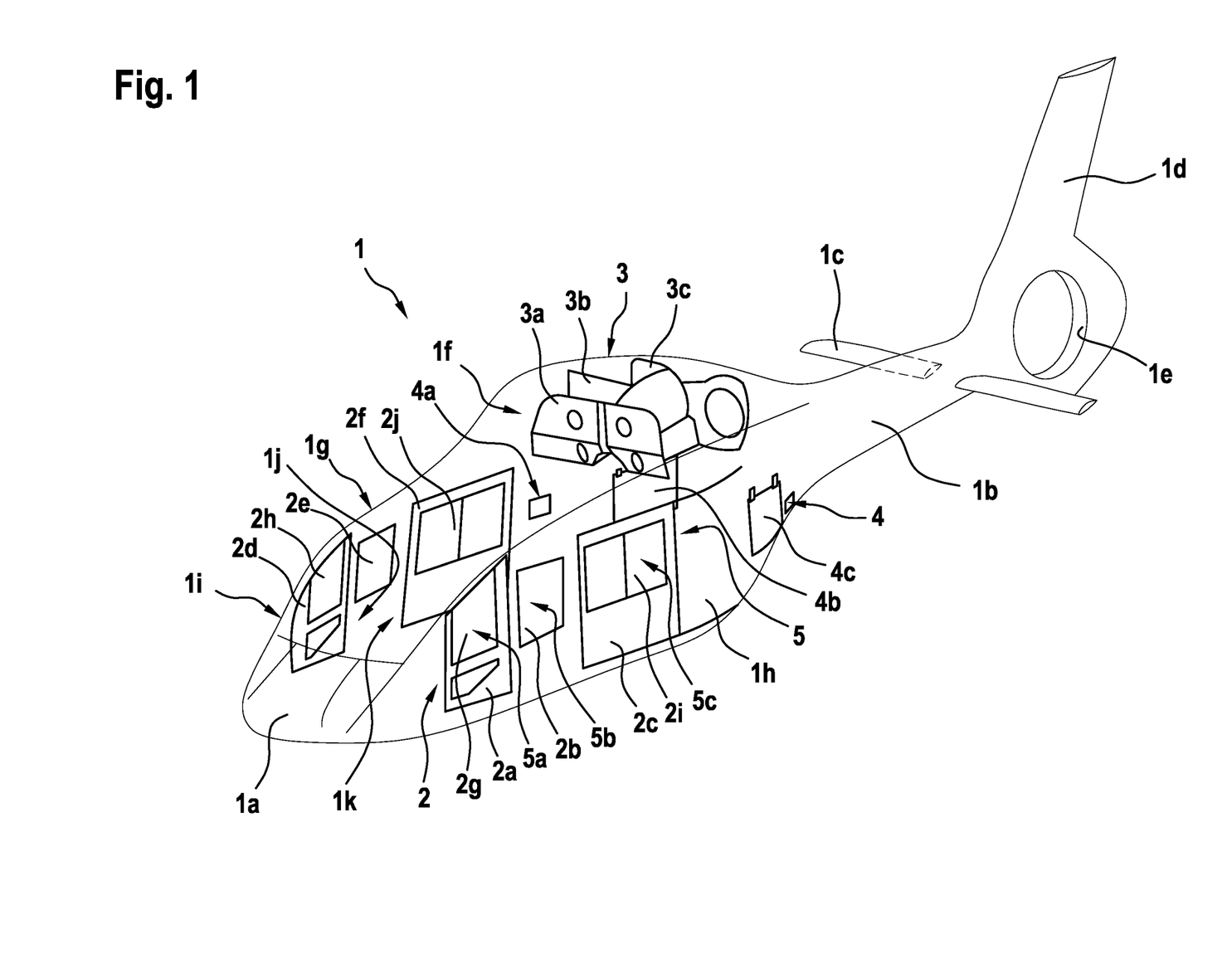
FIG. 1 shows a schematic view of a vehicle that is adapted to receive one or more emergency exit systems with jettisonable components and emergency evacuation assistance devices according to the present invention.

FIG. 1 shows a vehicle 1 that is exemplarily illustrated as an aircraft, in particular as a rotorcraft and, more particularly, as a helicopter. Thus, for purposes of simplicity and clarity, the vehicle 1 is hereinafter referred to as the "helicopter" 1. The present invention is, however, not limited to helicopters and can likewise be applied to any other vehicle, in particular to a vehicle that is controllable in a flowing medium, such as air or water, independent of a particular configuration thereof.

Illustratively, the helicopter 1 comprises a fuselage 1a that forms a tail boom 1b, which exemplarily comprises a tail wing 1c, a vertical tail plane 1d, which is also referred to hereinafter as the "fin 1d", and a shroud 1e for accommodation of a suitable counter-torque device, such as a tail rotor, which is configured to provide counter-torque during operation in order to balance the helicopter 1 in terms of yaw. The tail boom 1b may further be provided e.g. with a horizontal stabilizer, a bumper and so on.

It should be noted that only the fuselage 1a with the tail boom 1b are shown in FIG. 1 for purposes of simplicity and clarity of the drawings. However, other conventional components, such as e.g. a rotor and a landing gear of the helicopter 1, are not shown, as they are well-known to the person skilled in the art and not part of the present invention and would, thus, only unnecessarily encumber and complicate the representation.

Illustratively, the fuselage 1a comprises at least two longitudinal side walls, a portside shell 1h, which is also referred to hereinafter as the "portside wall 1h", and a starboard side shell 1i, which is also referred to hereinafter as the "starboard side wall 1i", both of which are preferably connected to the tail boom 1b. The portside wall 1h and the starboard side wall 1i are exemplarily equipped with a plurality of doors and/or windows 2.

By way of example, the portside wall 1a is equipped with a co-pilot door 2a having a co-pilot door window 2g, a portside passenger window 2b and a portside sliding door 2c having a portside sliding door window 2i. Likewise, the starboard side wall 1i is equipped with a pilot door 2d having a pilot door window 2h, a starboard side passenger window 2e and a starboard side sliding door 2f having a starboard side sliding door window 2j.

The fuselage 1a illustratively further comprises an outer surface 1g and preferably forms at least a drive system accommodating region 1f and a cockpit 1j, and may further form a passenger cabin 1k and/or a cargo compartment. However, for simplicity and conciseness of the description, such a cockpit 1j, passenger cabin 1k and cargo compartment are not explained in greater detail.

The drive system accommodating region 1f preferably accommodates one or more engines that are adapted for driving the helicopter 1, e.g. by providing power to an associated power distribution unit, such as a gearbox, which then provides this power to a suitable propelling unit, such as e.g. a propeller, rotor or other. Preferably, the one or more engines are embodied as air breathing propulsion engines, such as diesel engines, gas engines, gas turbines and so on, which combust a fuel/air mix for power generation. As all such air breathing propulsion engines generate heat, the drive system accommodating region 1f is equipped with at least one firewall arrangement 3 that defines a fire-resistant separation between the air breathing propulsion engines and remaining parts of the fuselage 1a. The at least one firewall arrangement 3 exemplarily comprises a front firewall 3a, a mid firewall 3b and a rear firewall 3c. The firewall arrangement 3 is, nevertheless, not limited to such a configuration and may also comprise more or less firewalls and/or additional components. However, as the air breathing propulsion engines and the firewall arrangement 3 as such are not part of the present invention, they are not explained in greater detail for brevity and conciseness.

Illustratively, the fuselage 1a and, more generally the helicopter 1, is further provided with a plurality of maintenance trapdoors 4. By way of example, the plurality of maintenance trapdoors 4 comprises two starboard side traps 4a, 4b and one portside trap 4c. However, as the plurality of maintenance trapdoors 4 as such are not part of the present invention, they are also not explained in greater detail for brevity and conciseness.

According to one aspect of the present invention, the fuselage 1a and, more generally the helicopter 1, is further provided with one or more emergency exit systems 5. Illustratively, the emergency exit systems 5 comprise a co-pilot door window emergency exit system 5a, a portside passenger window emergency exit system 5b and a portside sliding door window emergency exit system 5c.

At least one and preferably each one of the emergency exit systems 5 preferentially comprises at least one jettisonable component. According to one aspect, as described below by way of example with reference to FIG. 3, each jettisonable component is accommodated and locked in an associated frame structure of the vehicle 1 in normal operation mode, and releasable from the associated frame structure for being jettisoned from the vehicle 1 in an emergency mode. Each jettisonable component is preferably operable from inside and/or outside of the helicopter 1 for being released from the associated frame structure. The associated frame structure preferably forms an inner opening having a width of at least 0.48 m and a height of at least 0.66 m.

By way of example, the emergency exit system 5a is provided at the co-pilot door 2a and comprises a jettisonable component that is realized by means of the co-pilot door window 2g, the emergency exit system 5b is provided at the portside passenger window 2b and comprises a jettisonable component that is realized by means of the portside passenger window 2b, and the emergency exit system 5c is provided at the portside sliding door 2c and comprises a jettisonable component that is realized by means of the portside sliding door window 2i. However, the emergency exit systems 5 are not limited to the illustrated emergency exit systems 5a, 5b, 5c. Instead, more or less emergency exit systems can be provided. In particular, it should be noted that only a part of all preferably provided emergency exit systems is labelled for simplicity and clarity of the drawings and that, e.g. the pilot door 2d, the starboard side passenger window 2e and the starboard side sliding door 2f may likewise be provided with emergency exit systems according to the present invention, which are configured similar to the emergency exit systems 5a, 5b, 5c.

Figure 2:
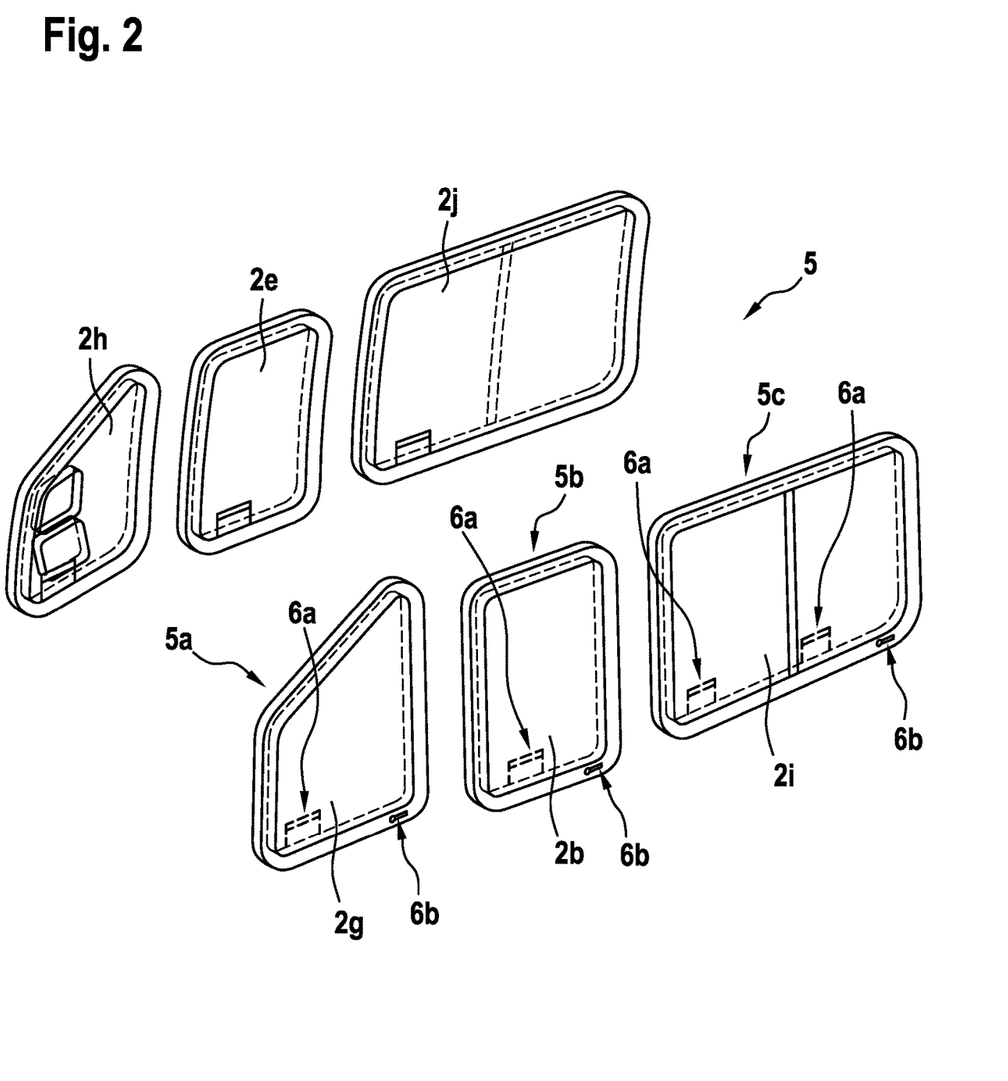
FIG. 2 shows an exploded perspective view of the jettisonable components of FIG. 1.

FIG. 2 shows the co-pilot door window 2g, the portside passenger window 2b, the portside sliding door window 2i, the pilot door window 2h, the starboard side passenger window 2e and the starboard side sliding door window 2j of FIG. 1. As described above, the windows 2g, 2b, 2i define the jettisonable components of the emergency exit systems 5a, 5b, 5c of FIG. 1. Similarly, the windows 2h, 2e, 2j preferably also define jettisonable components of respectively associated emergency exit systems.

According to one aspect of the present invention, each one of the jettisonable components 2g, 2b, 2i, i.e. the co-pilot door window 2g, the portside passenger window 2b, and the portside sliding door window 2i, is provided with at least one inner emergency exit system operating device 6a that forms an inner operating handle and preferably further comprises at least one outer emergency exit system opera t ing device 6b that forms an outer operating handle. By way of example, the jettisonable co-pilot door window 2g and the jettisonable portside passenger window 2b are respectively provided with a single inner emergency exit system operating device 6a and a single outer emergency exit system operating device 6b, while the jettisonable portside sliding door window 2i is provided with two inner emergency exit system operating devices 6a and a single outer emergency exit system operating device 6b.

Figure 3:
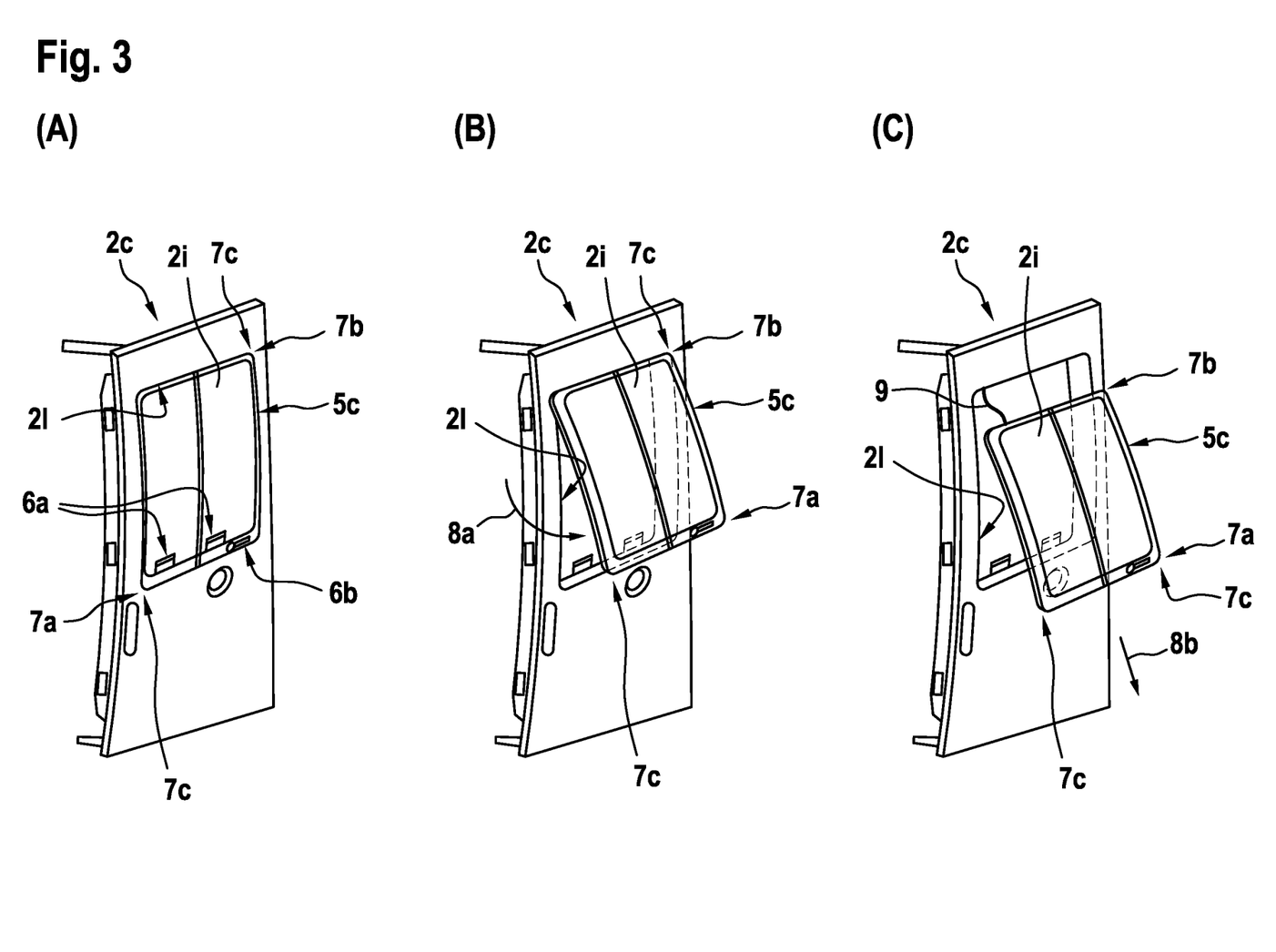
FIG. 3 shows an exemplary jettisoning process according to one aspect with respect to one of the emergency exit systems of FIG. 1.

FIG. 3 shows an exemplary operation of the emergency exit system 5c of FIG. 1 and FIG. 2, which preferably results in ejection of the jettisonable portside sliding door window 2i of FIG. 1 and FIG. 2 from the portside sliding door 2c of FIG. 1 and FIG. 2, as well as deployment of an associated emergency evacuation assistance device 9 of the emergency exit system 5c. According to one aspect, the emergency exit system 5c is operated in an emergency mode, wherein the vehicle 1 of FIG. 1 must be evacuated quickly and securely, as described in more detail below with reference to FIG. 7 and FIG. 8.

Illustratively, the jettisonable portside sliding door window 2i has a lower edge 7a, an upper edge 7b and lateral edges 7c, and is accommodated and locked in normal operation mode in an associated frame structure 2l of the vehicle 1 of FIG. 1, which is illustratively formed by a portside sliding door frame structure 2l provided by means of the portside sliding door 2c.

As illustrated in part (A) of FIG. 3, either the inner emergency exit system operating device 6a or the outer emergency exit system operating device 6b of FIG. 2 can be operated initially in an emergency mode for operating the emergency exit system 5c provided at the portside sliding door 2c. Thus, according to one aspect the jettisonable portside sliding door window 2i is released from the portside sliding door 2c.

As illustrated in part (B) of FIG. 3, after having released the jettisonable portside sliding door window 2i from the portside sliding door 2c, the jettisonable portside sliding door window 2i is first pivoted outwardly from the fuselage 1a of FIG. 1 by means of a rotational opening movement around an axis that is at least approximately parallel to the upper edge 7b, as illustrated with an arrow 8a. This is preferably achieved by manually pulling or pushing the lower edge 7a in the direction of the arrow 8a.

As illustrated in part (C) of FIG. 3, after having pivoted the jettisonable portside sliding door window 2i in direction of the arrow 8a, a translational ejection movement is performed, wherein the jettisonable portside sliding door window 2i is moved in a plane that is defined by the jettisonabie portside sliding door window 2i. Illustratively, this translational ejection movement is performed in direction of an arrow 8b. Thus, the jettisonable portside sliding door window 2i can entirely be removed from the portside sliding door 2c and, consequently, be jettisoned.

According to one aspect, the translational ejection movement of the jettisonable portside sliding door window 2i is accompanied by a deployment of the associated emergency evacuation assistance device 9. The emergency evacuation assistance device 9 is preferably attached to the jettisonable portside sliding door window 2i such that the emergency evacuation assistance device 9 is deployed by means of the jettisonable portside sliding door window 2i when the jettisonable portside sliding door window 2i is jettisoned from the portside sliding door 2c, i.e. from the vehicle 1 of FIG. 1, in the emergency mode. In other words, the emergency evacuation assistance device 9 will be deployed automatically upon jettisoning of the jettisonable portside sliding door window 2i from the portside sliding door 2c, i.e. from the vehicle 1 of FIG. 1, so that the deployment of the emergency evacuation assistance device 9 is the result of the jettisoning of the jettisonable portside sliding door window 2i. Therefore, the jettisoning and the deployment may be considered as a single operating action, in particular, as no further action is required for activating, releasing and/or hauling out of the emergency evacuation assistance device 9.

According to one aspect, the emergency evacuation assistance device 9 is adapted to assist in an emergency evacuation of the vehicle 1 of FIG. 1 via the associated frame structure of the vehicle 1 of FIG. 1, which is illustratively formed by the portside sliding door frame structure 2l provided by means of the portside sliding door 2c, in the emergency mode. The emergency evacuation assistance device 9 and, more generally, the emergency exit system 5c, is described in more detail below with reference to FIG. 6.

Figure 4:
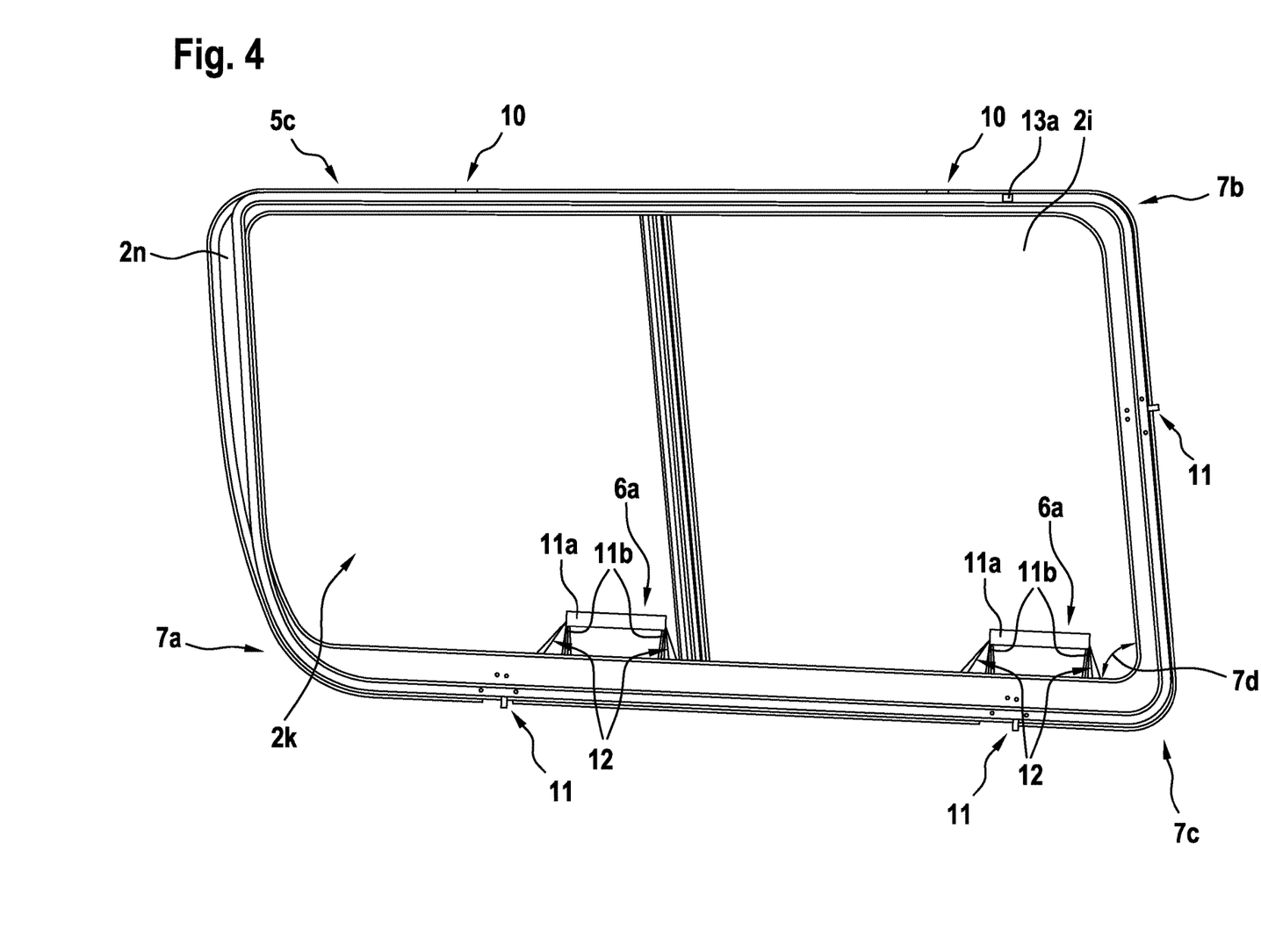
FIG. 4 shows a side view of an inner side of one jettisonable component of FIG. 2.

FIG. 4 shows the jettisonable portside sliding door window 2i of the emergency exit system 5c of FIG. 1 to FIG. 3, which is exemplarily provided at the portside sliding door 2c. The jettisonable port side sliding door window 2i is exemplarily illustrated as seen from the inside of the fuselage 1a of the helicopter 1 of FIG. 1 and illustratively comprises a window pane 2k.

Preferably, the jettisonable portside sliding door window 2i comprises a window frame 2n that is adapted to be accommodated and locked in an associated frame structure of a vehicle. As described above with reference to FIG. 3, the associated frame structure is illustratively formed by the portside sliding door frame structure 2l provided by means of the portside sliding door 2c.

According to one aspect, the window frame 2n is provided with a mounting component 13a, which is preferably integrated into the window frame 2n. The mounting component 13a is configured to enable mounting of the emergency evacuation assistance device 9 of FIG. 3 to the window frame 2n.

Furthermore, preferably at least one window retention means 10 and at least one window locking device 11 are integrated into the window frame 2n of the jettisonable portside sliding door window 2i. Preferably, the at least one window retention means 10 is adapted to allow the rotational movement of the jettisonable portside sliding door window 2i in the direction of the arrow 8a according to part (B) of FIG. 3 in the emergency mode. The at least one window locking device 11 is preferably adapted for locking the jettisonable portside sliding door window 2i in an associated locking position in the normal operation mode, which is similar to what is illustrated in part (A) of FIG. 3, and for releasing the jettisonable portside sliding door window 2i in the emergency mode upon activation, as illustrated in parts (B) and (C) of FIG. 3.

By way of example, the jettisonable portside sliding door window 2i comprises two retention means 10, as well as a single lateral and two lower locking devices 11. Preferably, the lateral locking device 11 is provided at a first section of the window frame 2n of the jettisonable portside sliding door window 2i, which is exemplarily defined by one of the lateral window edges 7c, and at least one and, illustratively, both lower locking devices 11 are provided at a second section of the window frame 2n, which is exemplarily defined by the lower window edge 7a. The first and second sections are arranged in a predetermined angle 7d at the window frame 2n with respect to each other, which preferably amounts to at least approximately 90, but which more preferably is at least comprised in a range between 80° and 100°.

Furthermore, at least one and, illustratively, both retention means 10 are preferably provided at a third section of the window frame 2n, which is exemplarily defined by the upper window edge 7b. The first and third sections are also arranged in a predetermined angle at the window frame 2n with respect to each other, which preferably also amounts to at least approximately 90, but which more preferably is at least comprised in a range between 80° and 100°.

While the two retention means 10 cannot be operated, i.e. activated, and, thus, are static components, the three locking devices 11, i.e. the single lateral and the two lower locking devices 11, can be operated, i.e. activated, by means of a window release strap (or band or bandage) 12 via the inner emergency exit system operating device 6a of FIG. 2 or the outer emergency exit system operating device (6b in FIG. 2) for releasing the jettisonable portside sliding door window 2i from the portside sliding door 2c as described above with reference to FIG. 3. In other words, preferably all three locking devices 11 are collectively connected to at least one window release strap 12.

Preferentially, the at least one window release strap 12 comprises synthetic fibers that are based on polyamide. More specifically, the at least one window release strap 12 comprises polyamide 6 (or PA6) and, more preferably, nylon.

According to one aspect of the present invention, the three locking devices 11 are connected to activation handles 11a of the inner emergency exit system operating device 6a of FIG. 2 and/or the outer emergency exit system operating device (6b of FIG. 2) via the at least one window release strap 12. While both systems can be connected to a single window release strap, preferably the activation handle 11a of the inner emergency exit activating system 6a is attached to a first window release strap 12 and a respective activation handle of the outer window release system (6b in FIG. 10) is attached to a second window release strap 12. Furthermore, the inner and outer activation handles are preferably arranged on opposed s ides of the jettisonable portside sliding door window 2i, such that the inner activation handle 11a is preferentially accessible from inside of the fuselage 1a of the helicopter 1 of FIG. 1, while the respective outer activation handle is preferentially accessible from the outside thereof. In the illustrated example, the jettisonable portside sliding door window 2i is provided with two inner activation handles 11a, each of which is preferably attached to the same (first) windows release strap 12 and retained in an associated handle holder 11b.

However, it should be noted that the jettisonable portside sliding door window 2i as such, as well as a release method for release of the jettisonable portside sliding door window 2i in the emergency mode, are not part of the present invention. Instead, reference is made to the European patent application EP 3 100 947 A1, which is explicitly incorporated into the present description by way of reference. Therein, configuration of a jettisonable portside sliding door window and a suitable release method are described in detail.

Figure 5:
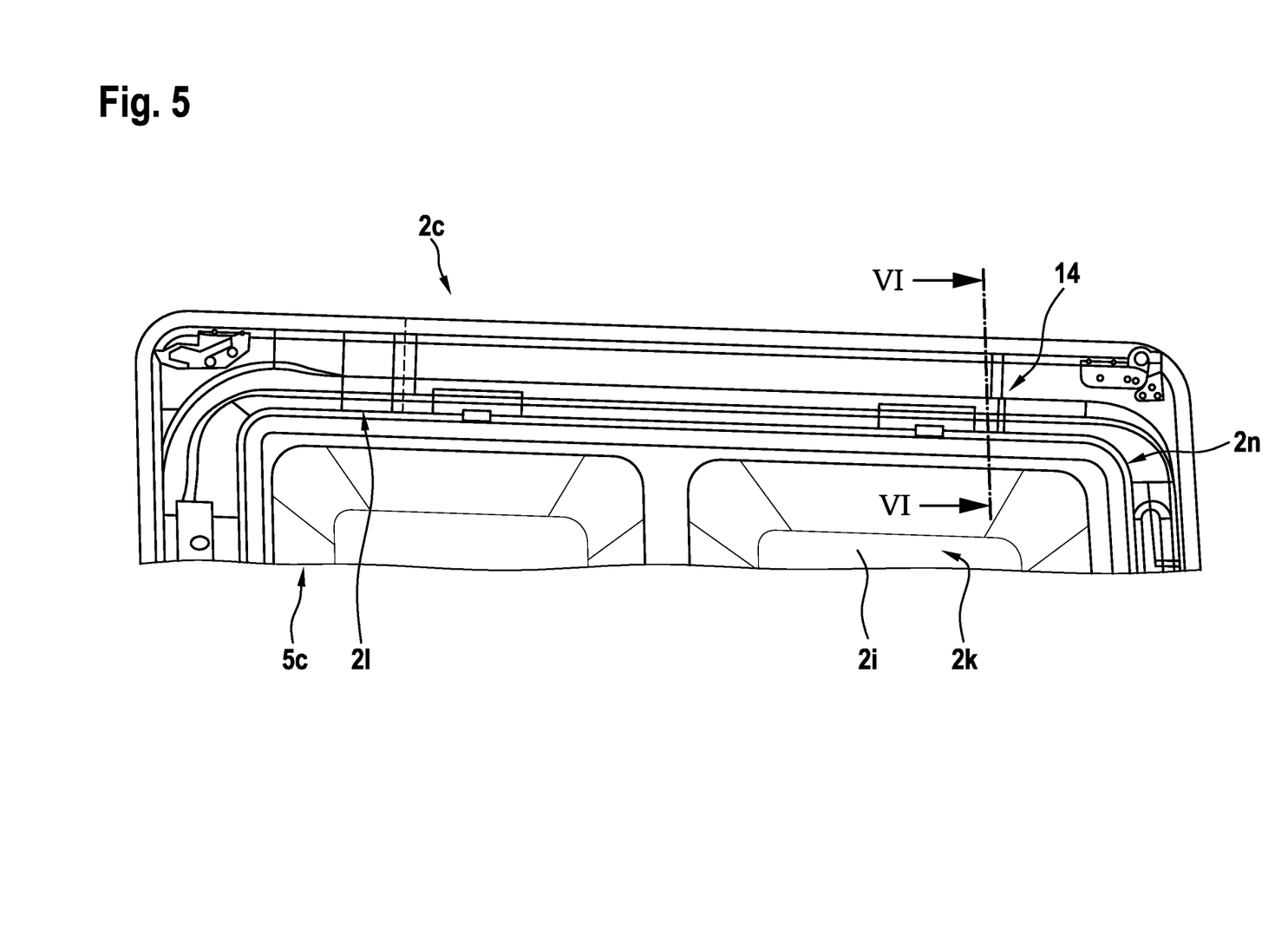
FIG. 5 shows a perspective view of a section of one of the emergency exit systems of FIG. 1, seen from the inside of the vehicle of FIG. 1.

FIG. 5 shows the portside sliding door 2c of FIG. 1 and FIG. 3 in the normal operation mode, with the emergency exit system 5c that comprises the jettisonable portside sliding door window 2*i* of FIG. 1 to FIG. 4 having the window pane 2*k* of FIG. 4. The portside sliding door 2*c* is exemplarily illustrated as seen from the inside of the fuselage 1*a* of the helicopter 1 of FIG. 1 and forms the frame structure 2*l*, wherein the window frame 2*n* of the jettisonable portside sliding door window 2*i* of FIG. 4 is accommodated and locked in the normal operation mode.

According to one aspect, the emergency exit system 5*c* comprises an evacuation assistance system 14 in addition to the jettisonable portside sliding door window 2*i*. The evacuation assistance system 14 is provided for assisting in an emergency evacuation of the vehicle 1 of FIG. 1 and, therefore, preferably comprises the emergency evacuation assistance device 9 of FIG. 3, as described in more detail hereinafter with reference to FIG. 6.

Figure 6:
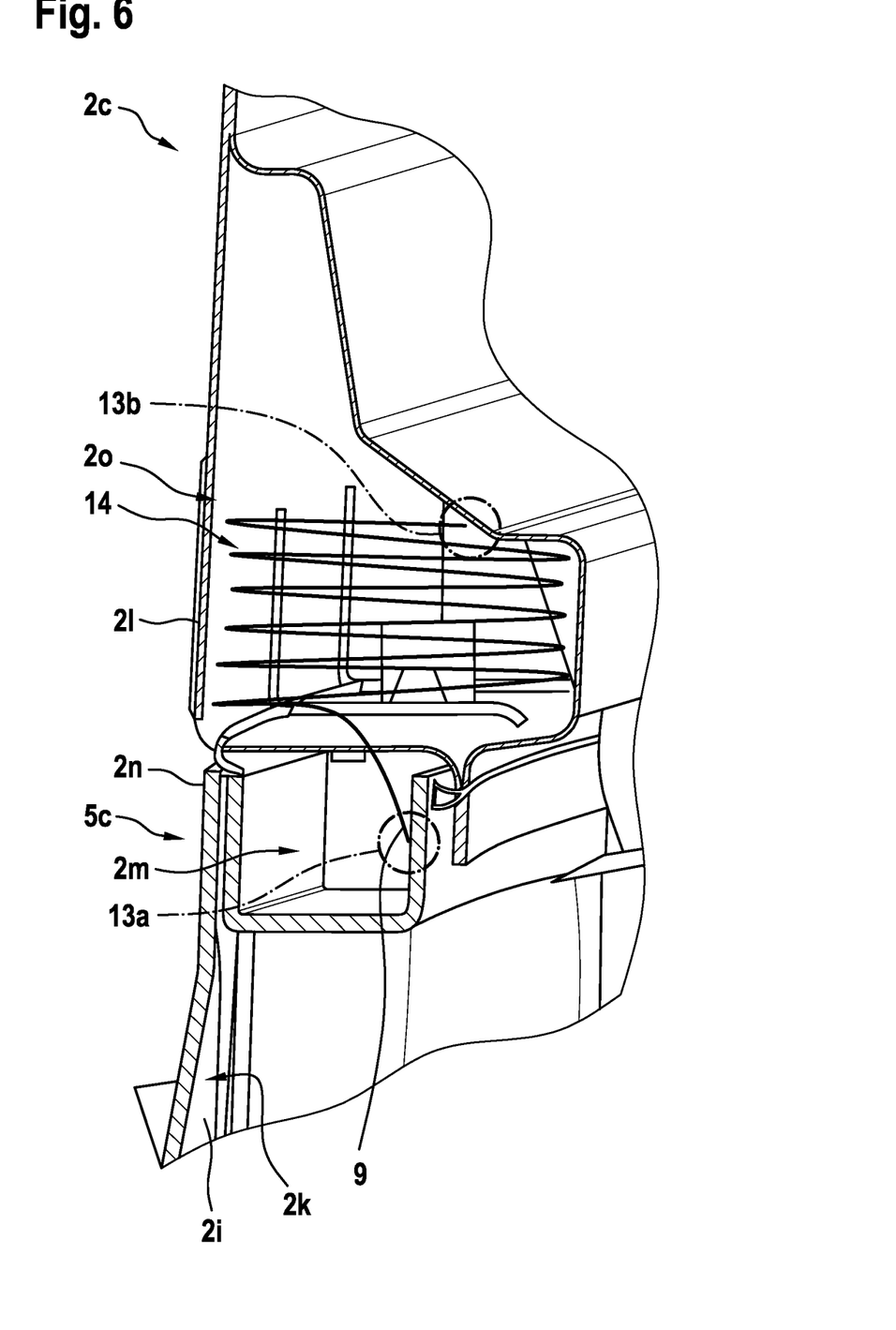
FIG. 6 shows a sectional view of the emergency exit system of FIG. 5.

FIG. 6 shows the portside sliding door 2*c* of FIG. 1, FIG. 3 and FIG. 5 in the normal operation mode, with the emergency exit system 5*c* that comprises the jettisonable portside sliding door window 2*i* with the window pane 2*k* of FIG. 4 and the evacuation assistance system 14 of FIG. 5. The portside sliding door 2*c* forms the frame structure 2*l*, wherein the window frame 2*n* of FIG. 4 of the jettisonable portside sliding door window 2*i* is accommodated and locked in the normal operation mode.

The evacuation assistance system 14 comprises the emergency evacuation assistance device 9 of FIG. 3, which is illustratively mounted to the window frame 2*n* of FIG. 4 by means of the mounting component 13*a* of FIG. 4. The mounting component 13*a* is illustratively arranged in a groove 2*m* provided in the window frame 2*n*. Illustratively, the groove 2*m* is an outer U-shaped groove.

Preferably, the emergency evacuation assistance device 9 is also mounted to another mounting component 13*b*, which is illustratively provided at or in the frame structure 2*l* of the portside sliding door 2*c*. Preferentially, the emergency evacuation assistance device 9, e.g. respective axial ends thereof, is rigidly attached to the frame structure 2*l* and to the window frame 2*n*. In this case, the mounting components 13*a*, 13*b* may merely represent fixing points.

According to one aspect, the emergency evacuation assistance device 9 is stored in the frame structure 2*l* in the normal operation mode and deployed from the frame structure 2*l* by means of the jettisonable portside sliding door window 2*i* when the jettisonable portside sliding door window 2*i* is jettisoned in the emergency mode. Preferably, the frame structure 2*l* comprises a hollow profile 2*o* and the emergency evacuation assistance device 9 is stored in the hollow profile 2*0* in the normal operation mode. In other words, the hollow profile 2*o* of the frame structure 2*l* of the portside sliding door 2*c* is used in the normal operation mode as a stowage compartment for the emergency evacuation assistance device 9. Thus, the emergency evacuation assistance device 9 is advantageously not visible in the normal operation mode.

Preferably, the emergency evacuation assistance device 9 is a rope, in particular a textile rope. Such a textile rope may e.g. comprise polyamide. Alternatively, the emergency evacuation assistance device 9 may be a rope ladder.

However, other suitable emergency evacuation assistance devices may likewise be contemplated and may even simply be derived from the common knowledge of the person skilled in the art, such as e.g. a belt. However, any respectively selected emergency evacuation assistance device must preferably at least withstand a 182 kg static load, i.e. a 400 pounds static load.

If the emergency evacuation assistance device 9 is a rope, in particular a textile rope, the mounting components 13*a*, 13*b* may be implemented as mounting rings to which the rope is rigidly attached. Therefore, the rope may e.g. be provided with spring safety hooks that may easily be engaged with the mounting rings. However, any other suitable mounting technique, such as e.g. a pressure-type or crimp connection, e.g. by means of suitable crimp plates and screws, bolts, rivets and so on, is likewise contemplated.

Figure 7:
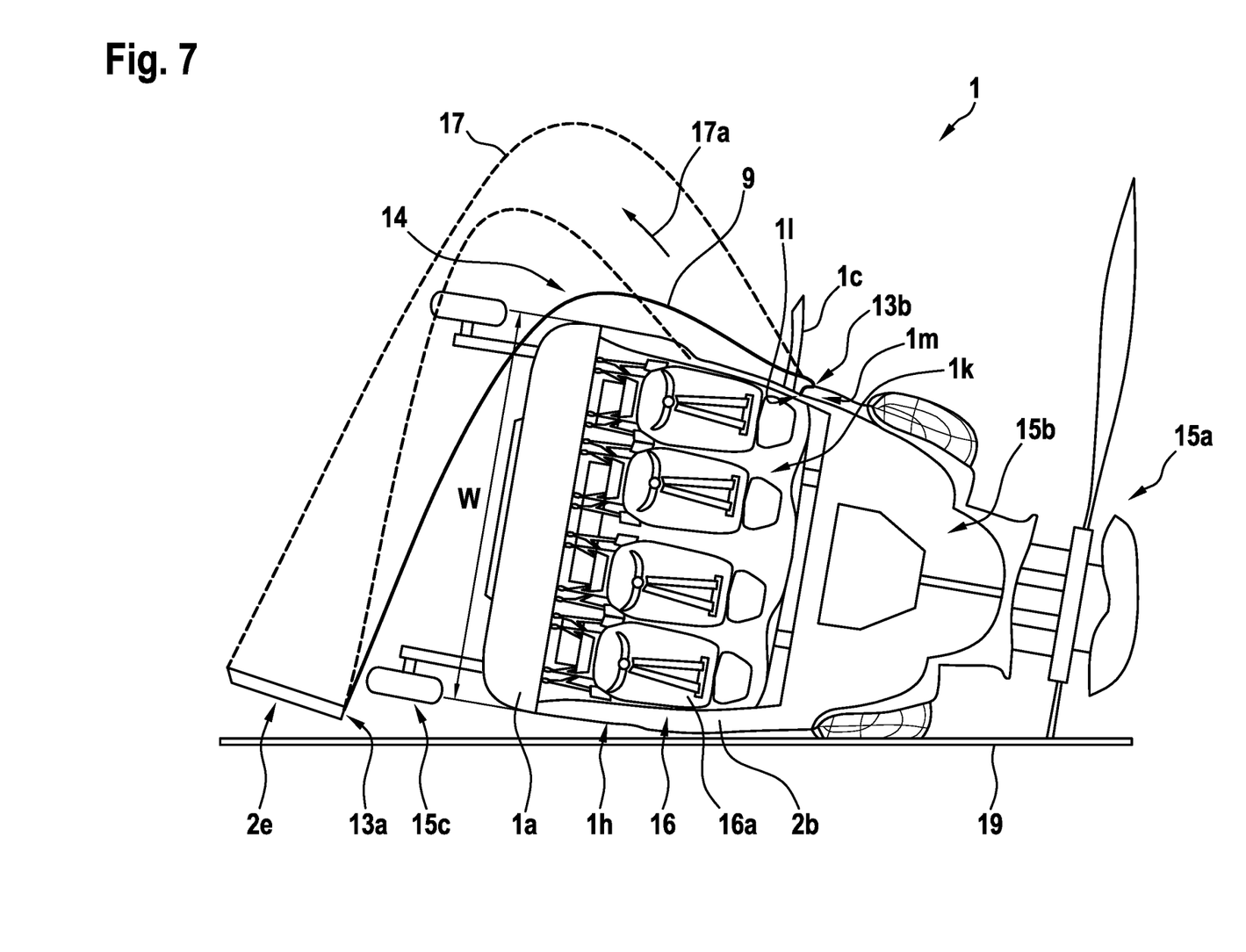
FIG. 7 shows a cut view of the vehicle of FIG. 1 in capsized position, lying on its portside wall.

FIG. 7 shows the helicopter 1 of FIG. 1 with the fuselage 1*a* that comprises the portside wall 1*h* and the starboard side wall 1*i*. The fuselage 1*a* illustratively forms the passenger cabin 1*k* of FIG. 1, which is exemplarily provided with a seat row 16 that comprises a predefined number of seats 16*a*. By way of example, four seats 16*a* are shown. Furthermore, a main rotor 15*a*, a drive system 15*b* and a landing gear 15*c* are illustrated.

The helicopter 1 is shown in a first exemplary emergency mode, in which a safe and secure evacuation of the passenger cabin 1*k* and, more generally, of the helicopter 1 as a whole is required. In this first exemplary emergency mode, the helicopter 1 is capsized and lying with its portside wall 1*h* on ground 16. Thus, any passengers that are seated on the seats 16*a* of the seat row 16 should preferably egress the passenger cabin 1*k* via a frame structure 11 that is associated with the starboard side passenger window 2*e* and formed in the fuselage 1*a* to accommodate, in the normal operation mode, the starboard side passenger window 2*e*.

As described above with reference to FIG. 2, an emergency exit system that is similar to the emergency exit system 5*b* is preferably provided at the starboard side passenger window 2*e* and associated with the latter. Accordingly, the starboard side passenger window 2*e* is coupled via an associated emergency evacuation assistance device to the fuselage 1*a* and, more particularly, to the frame structure 1*l* of the fuselage 1*a*. The associated emergency evacuation assistance device is preferably embodied similar to the associated emergency evacuation assistance device described above with reference to FIG. 6 and, therefore, also labelled with the reference sign 9 and referred to hereinafter as the "emergency evacuation assistance device 9". The emergency evacuation assistance device 9 is illustratively mounted to the starboard side passenger window 2*e* by means of a mounting component that is preferably embodied similar to the mounting component 13*a* of FIG. 6 and, therefore, also labelled with the reference sign 13*a* and hereinafter referred to as the "mounting component 13*a*". Likewise, the emergency evacuation assistance device 9 is illustratively mounted to the frame structure 1*l* by means of a mounting component that is preferably embodied similar to the mounting component 13*b* of FIG. 6 and, therefore, also labelled with the reference sign 13*b* and hereinafter referred to as the "mounting component 13*b*".

Furthermore, similar to what is described above with reference to FIG. 6, the associated emergency evacuation assistance device 9 is, in the normal operation mode, preferably stored in a hollow profile 1*m* formed by the fuselage 1*a* adjacent to, or as part of, the frame structure 11. The hollow profile 1*m* is preferably arranged above the starboard side passenger window 2*e*, i.e. in a region of the fuselage 1*a* that is, in normal operation mode, located between the starboard side passenger window 2*e* and the main rotor 15*a*.

According to one aspect, the starboard side passenger window 2*e* is jettisoned in the first exemplary emergency mode in a direction 17*a* after having been released from the frame structure 11 of the fuselage 1*a*. Releasing and ejecting of the starboard side passenger window 2*e* from the frame structure 11 is preferably performed as described above with reference to FIG. 3.

Illustratively, the starboard side passenger window 2e is jettisoned in the direction 17a along an exemplary trajectory 17 away from the frame structure 11 around the landing gear 15c towards the ground 16. As a result, the emergency evacuation assistance device 9, which is mounted to the starboard side passenger window 2e by means of the mounting component 13a, is pulled out of the hollow profile 1m and deployed along the exemplary trajectory. The deployment of the emergency evacuation assistance device a out of the hollow profile 1m is preferably at least partly performed by means of gravity, at least starting at a point, where the starboard side passenger window 2e is following the exemplary trajectory 17 as a result of the gravity acting on it.

As described above with reference to FIG. 6, the emergency evacuation assistance device 9 is preferably a rope, in particular a textile rope which may e.g. comprise polyamide. Alternatively, the emergency evacuation assistance device 9 may be a rope ladder. According to one aspect, this rope or rope ladder has a length that is configured for use with the helicopter 1 if the latter exhibits a bottom width W of more than 1.8 m. Thus, the rope or rope ladder has preferably a length of at least 2 m.

Figure 8:
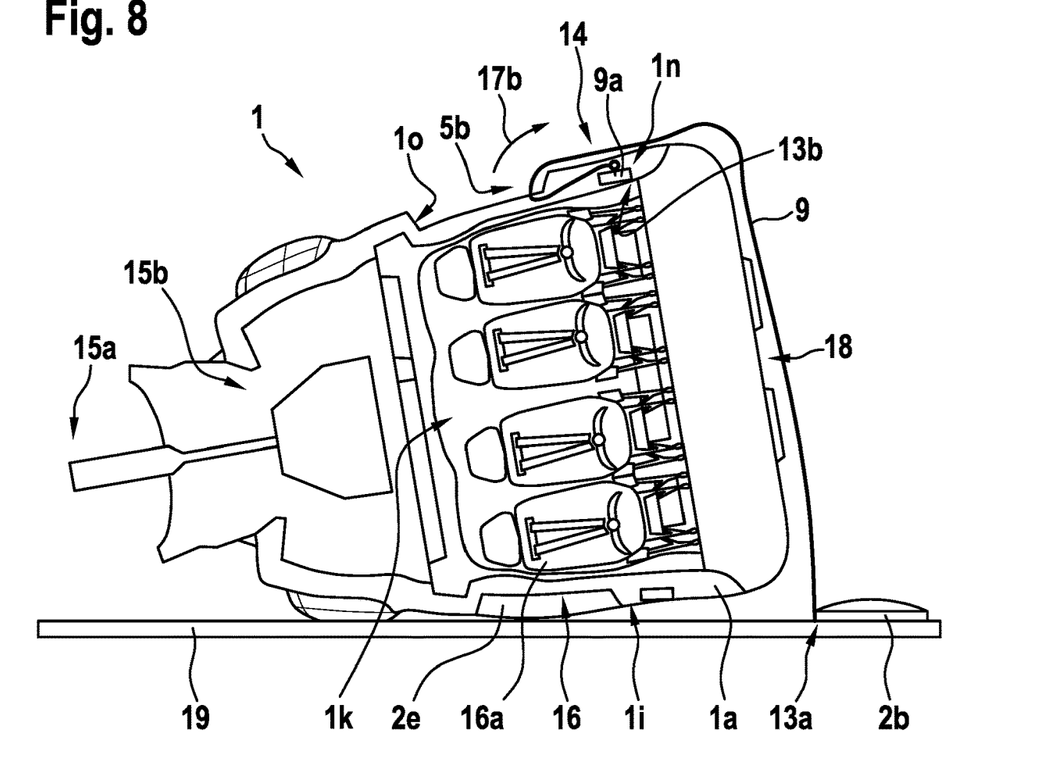
FIG. 8 shows a cut view of the vehicle of FIG. 1 in capsized position, lying on its starboard side wall.

FIG. 8 shows the helicopter 1 of FIG. 1 with the main rotor 15a, the drive system 15b and the landing gear 15c of FIG. 7, as well as the fuselage 1a that comprises the portside wall 1h and the starboard side wall 1i. The fuselage 1a illustratively forms the passenger cabin 1k of FIG. 7, which is exemplarily provided with the seat row 16 that comprises the seats 16a.

The helicopter 1 is shown in a second exemplary emergency mode, in which a safe and secure evacuation of the passenger cabin 1k and, more generally, of the helicopter 1 as a whole is required. In this second exemplary emergency mode, the helicopter 1 is capsized and lying with its starboard side wall 1i on the ground 16. Thus, any passengers that are seated on the seats 16a of the seat row 16 should preferably egress the passenger cabin 1k via a frame structure 1o that is associated with the portside passenger window 2b and formed in the fuselage 1a to accommodate, in the normal operation mode, the portside passenger window 2b.

As described above with reference to FIG. 2, the emergency exit system 5b is preferably provided at the portside passenger window 2b and associated with the latter. Accordingly, the portside passenger window 2b is coupled via an associated emergency evacuation assistance device to the fuselage 1a and, more particularly, to the frame structure 1o of the fuselage 1a. The associated emergency evacuation assistance device is preferably embodied similar to the associated emergency evacuation assistance device described above with reference to FIG. 6 and, therefore, also labelled with the reference sign 9 and referred to hereinafter as the "emergency evacuation assistance device 9". The emergency evacuation assistance device 9 has preferentially a length as described above with reference to FIG. 7 and is illustratively mounted to the port side passenger window 2b by means of a mounting component that is preferably embodied similar to the mounting component 13a of FIG. 6 and, therefore, also labelled with the reference sign 13a and hereinafter referred to as the "mounting component 13a".

However, in contrast to FIG. 6 and FIG. 7, the emergency evacuation assistance device 9 is not mounted to the frame structure 1o. Instead, the emergency evacuation assistance device 9 is illustratively coupled to a stowage device 9a, which in turn is mounted to the frame structure 1o by means of a suitable mounting component. This suitable mounting component may be embodied similar to the mounting component 13b of FIG. 6 and is, therefore, also labelled with the reference sign 13b and hereinafter referred to as the "mounting component 13b". The stowage device 9a is further described below with reference to FIG. 9.

According to one aspect, the stowage device 9a as a whole is, in the normal operation mode, stored in a hollow profile 1n formed by the fuselage 1a adjacent to, or as part of, the frame structure 1o. The hollow profile 1n is illustratively arranged below the portside passenger window 2b, i.e. in a region of the fuselage 1a that is, in normal operation mode, located between the portside passenger window 2b and a bottom region 18 of the fuselage 1a.

According to one aspect, the portside passenger window 2b is jettisoned in the second exemplary emergency mode in a direction 17b after having been released from the frame structure 1o of the fuselage 1a. Releasing and ejecting of the portside passenger window 2b from the frame structure 1o is preferably performed as described above with reference to FIG. 3.

Illustratively, the portside passenger window 2b is jettisoned in the direction 17b away from the frame structure 1o around the bottom region 18 of the fuselage 1a towards the ground 16. As a result, the emergency evacuation assistance device 9, which is mounted to the portside passenger window 2b by means of the mounting component 13a, is pulled out of the stowage device 9a and, thus, out of the hollow profile 1n and deployed in the direction 17b.

Figure 9:
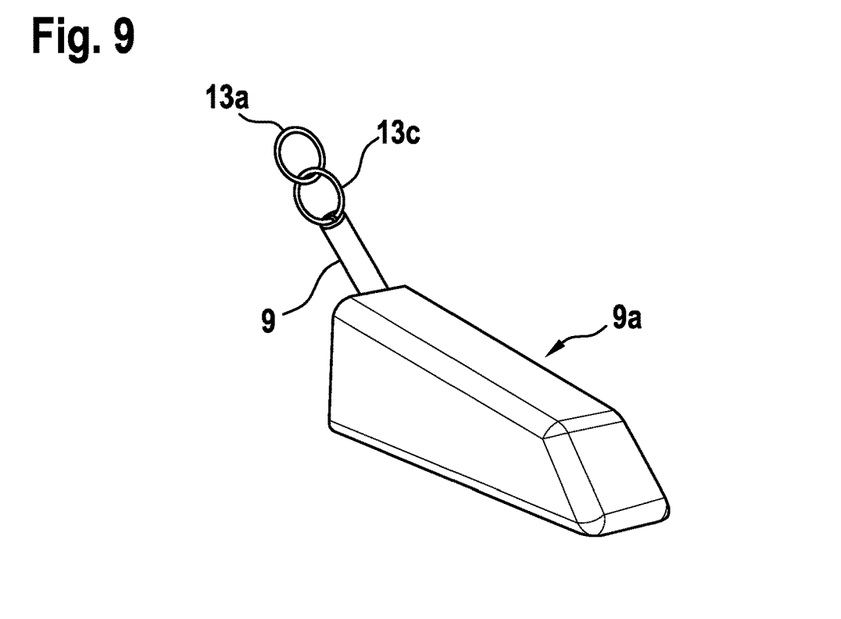
FIG. 9 shows a perspective view of an exemplary rope stowage.

FIG. 9 shows the stowage device 9a of FIG. 8 with the emergency evacuation assistance device 9 of FIG. 6 to FIG. 8, which is illustratively embodied as a belt. Preferably, the stowage device 9a comprises an automatic roll-up mechanism that keeps the belt rolled-up in the normal operation mode.

According to one aspect, the belt is provided with an intermediate mounting component 13c, which is provided to enable mounting of the belt to the mounting component 13a of FIG. 6 to FIG. 8. Illustratively, the mounting components 13a, 13c are ring-shaped.

However, it should be noted that a suitable stowage device that may be used for implementing the stowage device 9a as well as a respective automatic roll-up mechanism are well-known to the person skilled in the art. Therefore, a detailed description thereof is omitted, for brevity and conciseness.

It should be noted that modifications to the above described embodiments are within the common knowledge of the person skilled in the art and, thus, also considered as being part of the present invention. It should further be noted that the drawings are only intended for schematically representing embodiments of the present invention and not for showing detailed constructions thereof.

REFERENCE LIST 1 rotary wing aircraft
1a fuselage
1b tail boom
1c tail wing
1d fin
1e tail rotor shroud
1f drive system accommodating region
1g aircraft outer surface
1h port side wall
1i starboard side wall.
1j cockpit
1k passenger cabin
1l frame structure in portside wall of fuselage
1m, 1n hollow profiles in fuselage 1o frame structure in starboard side wall of fuselage
2 aircraft doors and windows
2a co-pilot door
2b portside passenger window
2c portside sliding door
2d pilot door
2e starboard side passenger window
2f starboard side sliding door
2g co-pilot door window
2h pilot door window
2i port s ide sliding door window
2j starboard side sliding door window
2k portside sliding door window pane
2l port s ide sliding door frame structure
2m frame groove
2n portside sliding door window frame
2o hollow profile in sliding door frame structure
3 firewall arrangement
3a front firewall
3b mid firewall
3c rear firewall
4 maintenance traps
4a, 4b starboard side maintenance traps
4c portside maintenance t raps
5 aircraft emergency exit systems
5a co-pilot door window emergency exit system
5b portside passenger window emergency exit system
5c portside sliding door window emergency exit system
6a inner emergency exit system operating device
6b outer emergency exit system operating device
7a lower window edge
7b upper window edge
7c lateral window edges
7d predetermined angle
8a rotational opening movement
8b translational ejection movement
9 evacuation rope
9a rope stowage
10 window retention means
11 window locking device
11a lower locking device inner activation handle
11b handle holder
12 window release strap
13a window-sided rope mounting component
13b door-sided rope mounting component
13c intermediate mounting component
14 evacuation assistance system
15a main rotor
15b drive system
15c landing gear
16 seat row
16a seat
17 starboard side passenger window ejection trajectory
17a, 17b ejection directions
18 bottom region of fuselage
W cabin width

What is claimed is:

1. An aircraft with a fuselage and at least one emergency exit system, the at least one emergency exit system having:
a jettisonable component that is:
accommodated and locked in an associated frame structure of the aircraft in normal operation mode, to form a portion of the fuselage; and
releasable from the associated frame structure for being jettisoned from the aircraft in an emergency mode; and
an emergency evacuation assistance device that is adapted to assist in an emergency evacuation of the aircraft via the associated frame structure in the emergency mode; wherein
the jettisonable component being at least provided with an inner operating device and an outer operating device, the inner and outer operating devices being arranged on opposite sides of the jettisonable component and is operable from inside and/or outside of the aircraft for being released from the associated frame structure, wherein the emergency evacuation assistance device is attached to the jettisonable component such that the emergency evacuation assistance device is deployed by means of the jettisonable component when the jettisonable component is jettisoned from the aircraft in the emergency mode; and
wherein the emergency evacuation assistance device is stored in the associated frame structure of the aircraft in the normal operation mode, and deployed from the associated frame structure by means of the jettisonable component when the jettisonable component is jettisoned from the aircraft in the emergency mode.

2. The aircraft of claim 1, wherein the jettisonable component is an aircraft window with a window frame that is accommodated and locked in the associated frame structure of the aircraft in the normal operation mode, and wherein the emergency evacuation assistance device is rigidly attached to the window frame.

3. The aircraft of claim 2, wherein the associated frame structure is provided in an aircraft door of the aircraft.

4. The aircraft of claim 3, wherein the aircraft door of the aircraft is a sliding door.

5. The aircraft of claim 1, which is embodied as a rotorcraft.

6. The aircraft of claim 5, wherein the associated frame structure is provided in the fuselage, a pivotable door, or a sliding door of the aircraft.

7. The aircraft of claim 6, wherein the associated frame structure forms an inner opening having a width of at least 0.48 m and a height of at least 0.66 m.

8. The aircraft of claim 1, wherein the emergency evacuation assistance device is one of a rope or a textile rope.

9. The aircraft of claim 1, wherein the emergency evacuation assistance device is a rope ladder.

10. The aircraft of claim 1, wherein the emergency evacuation assistance device withstands at least a 182 kg static load.

11. The aircraft of claim 1, wherein the associated frame structure comprises a hollow profile, and wherein the emergency evacuation assistance device is stored in the hollow profile in the normal operation mode.

12. The aircraft of claim 1, wherein the emergency evacuation assistance device is rigidly attached to the associated frame structure.

13. The aircraft of claim 1, wherein the inner operating device forms an inner operating handle, and the outer operating device forms an outer operating handle, the inner and outer operating handles being activatable for releasing the jettisonable component from the associated frame structure in the emergency mode.

14. The aircraft of claim 1, comprising a plurality of emergency exit systems, wherein each one of the plurality of emergency exit systems comprises an associated jettisonable component and an emergency evacuation assistance device that is attached to the associated jettisonable component such that the emergency evacuation assistance device is deployed by means of the associated jettisonable component when the associated jettisonable component is jettisoned from the aircraft in the emergency mode.

15. The aircraft of claim 1, wherein the portion of the fuselage comprises a door.

16. The aircraft of claim 1, wherein the portion of the fuselage comprises a window.

17. An aircraft comprising:
a fuselage; and
an emergency exit system having:
- a jettisonable component accommodated and locked in an associated frame structure of the aircraft in normal operation mode to form a portion of the fuselage, the jettisonable component being releasable from the associated frame structure for being jettisoned from the aircraft in an emergency mode; and
- an emergency evacuation assistance device adapted to assist in an emergency evacuation of the aircraft via the associated frame structure in the emergency mode;
the jettisonable component having an inner operating device and an outer operating device, the inner and outer operating devices arranged on opposite sides of the jettisonable component, the jettisonable component being operable from inside and/or outside of the aircraft for being released from the associated frame structure, the emergency evacuation assistance device being attached to the jettisonable component such that the emergency evacuation assistance device is deployed by the jettisonable component when the jettisonable component is jettisoned from the aircraft in the emergency mode; and
the emergency evacuation assistance device being stored in the associated frame structure of the aircraft in the normal operation mode, and deployed from the associated frame structure by the jettisonable component when the jettisonable component is jettisoned from the aircraft in the emergency mode.

18. The aircraft of claim 17, wherein the jettisonable fuselage component comprises a door or a window and the emergency evacuation assistance device comprising a rope or a ladder.

19. A helicopter comprising:
a fuselage; and
an emergency exit system having:
- a jettisonable fuselage component accommodated and locked in an associated frame structure of the helicopter in normal operation mode to form a portion of the fuselage, the jettisonable fuselage component being releasable from the associated frame structure for being jettisoned from the helicopter in an emergency mode; and
- an emergency evacuation assistance device adapted to assist in an emergency evacuation of the helicopter via the associated frame structure in the emergency mode;
the jettisonable fuselage component having an inner operating handle and an outer operating handle, the inner and outer operating handles arranged on opposite sides of the jettisonable fuselage component, the jettisonable fuselage component being operable from inside and outside of the helicopter for being released from the associated frame structure, the emergency evacuation assistance device being attached to the jettisonable fuselage component such that the emergency evacuation assistance device is deployed by the jettisonable fuselage component when the jettisonable fuselage component is jettisoned from the helicopter in the emergency mode; and
the emergency evacuation assistance device being stored in the associated frame structure of the helicopter in the normal operation mode, and deployed from the associated frame structure by the jettisonable fuselage component when the jettisonable fuselage component is jettisoned from the helicopter in the emergency mode.

20. The helicopter of claim 19, wherein the jettisonable fuselage component comprises a door or a window and the emergency evacuation assistance device comprising a rope or a ladder.

* * * * *